United States Patent

[11] 3,629,686

[72] Inventors: Wilhelmus Theodorus Hendrikus Hetterscheid; Gerrit Pieter Johannes, Van Schaik, Nijmegen, Netherlands
[21] Appl. No.: 27,923
[22] Filed: Apr. 13, 1970
[45] Patented: Dec. 21, 1971
[73] Assignee: U.S. Philips Corporation, New York, N.Y.
[32] Priorities: Apr. 25, 1969
[33] Netherlands
[31] 6906394; Nov. 4, 1969, Netherlands, No. 6916660

[54] VOLTAGE SUPPLY APPARATUS FOR APPLYING A DIRECT CURRENT TO A PERIODICALLY VARYING LOAD
10 Claims, 7 Drawing Figs.

[52] U.S. Cl. .................................... 321/18, 307/240, 321/47
[51] Int. Cl. ................................................. H02m 7/12
[50] Field of Search ........................................ 307/240; 321/11, 16, 18

[56] References Cited
UNITED STATES PATENTS

| | | | |
|---|---|---|---|
| 3,323,034 | 5/1967 | Dubin et al. | 321/16 |
| 3,538,418 | 11/1970 | Allington | 321/18 |
| 3,530,363 | 9/1970 | Schimke et al. | 321/16 |
| 3,197,691 | 7/1965 | Gilbert | 321/18 |
| 3,400,319 | 9/1968 | Stich | 321/18 X |
| 3,517,301 | 6/1970 | Huber | 321/18 X |
| 3,525,033 | 8/1970 | Greenberg et al. | 321/18 X |

*Primary Examiner*—William M. Shoop, Jr.
*Attorney*—Frank R. Trifari

ABSTRACT: A voltage supply apparatus for feeding a periodically varying load provided with a safety circuit wherein a rectified voltage originating from the mains is converted into an output direct voltage by means of a chopper. The switching frequency of the chopper is at least equal to that of the load. The apparatus comprises measuring means by which the chopper is stopped in case of overload, while a smoothing capacitor having a comparatively low capacitance is arranged parallel to the load. After an overload the output voltage is slowly built up. For this purpose the ratio between the active period of the chopper and the period of the switching frequency must become small ($\approx 0.1$). This is achieved by using a thyristor as a pulse duration modulator and by having a capacitor of high value shunt a reference voltage element in the comparison circuit of the chopper. The coil of the chopper constitutes the primary winding of a transformer secondary windings of which drive diodes which conduct simultaneously with the efficiency diode of the chopper so as to generate further direct voltages. In a preferred embodiment the apparatus feeds the line deflection circuit of a picture display device wherein the switching frequency is the line frequency and wherein the output voltage can be modulated by a parabola voltage of field frequency for the purpose of correcting the East-West-pincushion distortion.

INVENTORS
WILHELMUS TH. H. HETTERSCHEID
GERRIT P. J. VAN SCHAIK
BY

AGENT

VOLTAGE SUPPLY APPARATUS FOR APPLYING A DIRECT CURRENT TO A PERIODICALLY VARYING LOAD

The invention relates to a voltage supply apparatus for applying a direct current to a periodically varying load comprising a converter for converting an input voltage obtained by rectification between two terminals into an output direct voltage which is present across the load, and measuring means for switching off the direct current if this current exceeds a given value.

Voltage supply apparatus applying a stabilized or nonstabilized voltage to one or more loads and which are provided with a safety circuit have been known for a long time. The safety circuit generally consists in that a small measuring resistor is arranged in series with the load so that the same current flows through this resistor as that in the load itself. If this current becomes too high i.e. if it exceeds a previously determined value, the voltage across the measuring resistor becomes too high so that a circuit is activated which either limits the current to the admissible value or switches off the entire apparatus. If the overload disappears the normal current is generally restored. Such a safety circuit is described, for example, in German "Auslegeschrift" Pat. No. 1,152,480 wherein a transistor starts to conduct to a greater extent due to the increase of the voltage across the measuring resistor. As a result the transistor applying the current to the load conducts less and this current remains limited which safeguards the last-mentioned transistor.

If such a voltage supply apparatus provides a stabilized i.e. a substantially constant voltage, the output voltage thereof must be substantially independent of the variations in the output voltage (and hence of the variations in the power main voltage from which the input voltage is generally obtained by means of rectification) and of the variations in the load. This consideration makes it necessary for capacitors of great capacitance to be present across both the input terminals and across the output terminals by which quick fluctuations can be obviated while slow variations are compensated by the control circuit present in the apparatus. This also applies to the ripple voltage superimposed on the input voltage and remaining after rectification of the power main voltage, the frequency of which ripple voltage is 50 or 100 Hz. for a power main frequency of 50 Hz. dependent on whether the rectifier is a half-wave or a full-wave rectifier.

If an overload occurs the impedance of the load becomes low or zero (=short circuit). In the known circuits it will then take some time before the signal derived form the measuring means will be able to switch off the direct current applied to the load. In addition the large output capacitor will be discharged in the load circuit after said switching off. Both effects cause current to be applied to the (low ohmic) load for a rather long time after the overload has occurred so that this load is still destroyed. To prevent this destruction in all cases the voltage supply apparatus is characterized in that the converter includes a switching element which is driven by a periodic pulsatory signal so that under normal circumstances the element is closed during part of the period and is open during the other part of the period, one of the measuring means blocking the switching element when said value of the derived signal is exceeded, the frequency of the pulsatory signal being at least the frequency of the load and a smoothing capacitor of small capacitance being arranged parallel to the load.

The invention is based on the recognition of the fact that the switching element can be instantaneously switched off in case of overload by causing the switching signal to drop out. Due to the high-switching frequency by which the switching element is driven the value of the smoothing output capacitor can be maintained small so that the small charge of the capacitor can flow away very quickly after the switching element is switched off. Consequently the time during which current can flow after the occurrence of a possible short circuit is considerably reduced relative to the time required therefore in the known circuits.

It is to be noted that a periodically varying load may comprise, for example, the supply current of a line deflection circuit in a picture display device which also generates in known manner the voltage for the final anode of the picture display tube which forms part of the device. In fact, in this case the impedance of the load varies in the rhythm of the line frequency which is 15,625 Hz. in many countries so that the output capacitor can smooth the output voltage at a comparatively low capacitance. It is to be noted that it is known per se from German Auslegeschrift Pat. No. 1,293,304 to use a so-called "chopper" for supplying a periodically varying load wherein the frequency of the load variations or a harmonic thereof is chosen for the switching frequency. The circuit according to this German Auslegeschrift does not, however, comprise a safety circuit nor is there any requirement imposed as regards the capacitance of the output capacitor.

Since this output capacitor has a small capacitance its impedance for low frequency is high so that these frequencies are not smoothed. If the voltage supply apparatus according to the invention is used for the supply of a line deflection circuit and includes means by which the output voltage may vary it is therefore possible to superimpose a low-frequency voltage on the output voltage and to this end the voltage supply apparatus according to the invention is characterized in that the frequency of the pulsatory voltage is the line frequency or a harmonic thereof and that the variation of the output voltage is at field frequency and has a parabola shape in order to correct the East-West pincushion distortion on the screen of the picture display tube.

However, the above also applies to the 50 or 100 Hz. ripple voltage originating from the rectifier. If the capacitance of the capacitor used for smoothing the input voltage is likewise chosen to be small, this ripple voltage has a great amplitude. Consequently, it is necessary for compensation means to be present so as to reduce the ripple voltage across the output capacitor and to this end the voltage supply apparatus according to the invention is characterized in that part of the ripple voltage superimposed on the input voltage is applied to the means by which the output voltage can vary.

In order that the invention may be readily carried into effect a few embodiments thereof will now be described in detail by way of example with reference to the accompanying diagrammatic drawings in which.

Figure 1:
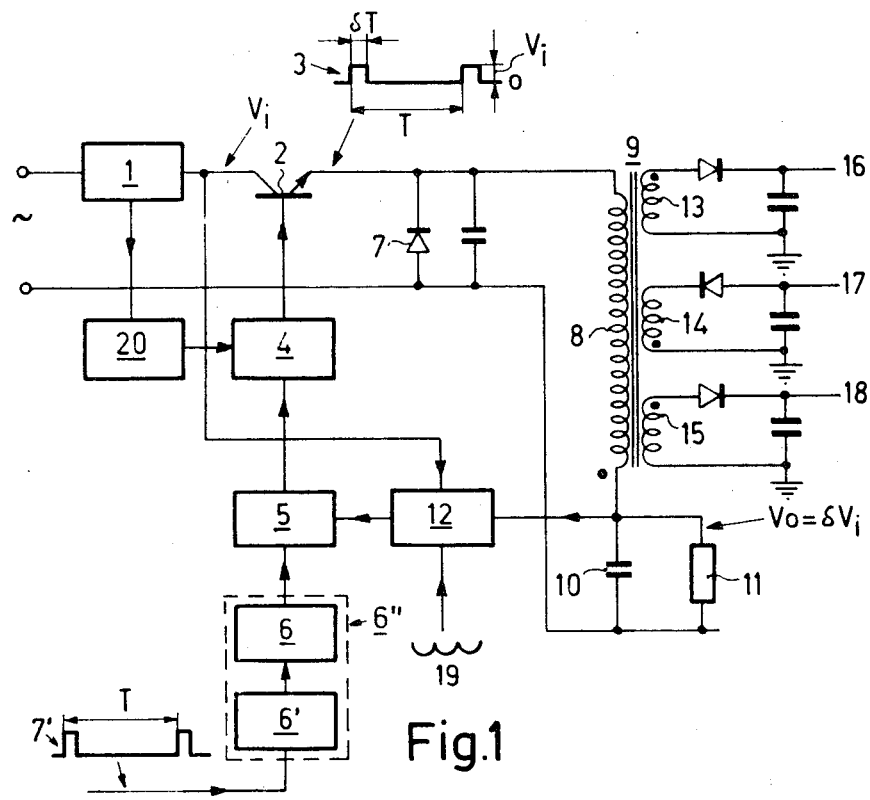
FIG. 1 shows a principle circuit diagram wherein the chopper is shown, but other circuits are not further shown.

In FIG. 1 the reference numeral 1 denotes a rectifier circuit which converts the power main voltage applied thereto into a nonstabilized direct voltage. The collector of a switching transistor 2 is connected to one of the two terminals between which this direct voltage is obtained, which transistor is of the NPN-type in this embodiment and the base of which receives a pulsatory voltage which originates through a control stage 4 from a modulator 5 and which causes transistor 2 alternately to be saturated and cut off. The voltage waveform 3 is produced at the emitter of transistor 2. In order to maintain the output voltage of the circuit arrangement constant, the duration of the pulses applied is varied in modulator 5. A pulse oscillator 6 applies the pulsatory voltage to modulator 5 and is synchronized by a signal of line frequency which originates from the line oscillator 6' present in the picture display device. This line oscillator 6' is in turn directly synchronized in known manner by pulses 7' of line frequency which are present in the device and originate, for example, from a received television signal if the picture display device is a television receiver. Pulse oscillator 6 thus generates a pulsatory voltage the repetition frequency of which is the line frequency or a harmonic thereof. In this embodiment the line frequency itself is chosen.

The emitter of switching transistor 2 is connected at one end to the cathode of an efficiency diode 7 whose other end is connected to the second input voltage terminal and at the other end to the primary winding 8 of a transformer 9. Pulsatory voltage 3 which is produced at the cathode of efficiency diode 7 is clamped against the potential of said second terminal during the intervals when it conducts. During the other intervals pulsatory voltage 3 assumes the value $V_i$. A charge capacitor 10 and a load 11 are arranged between the other end of winding 8 and the second input terminal. The elements 2, 7, 8, 10 and 11 constitute a so-called chopper producing a direct voltage across the charge capacitor 10, provided that capacitor 10 has a sufficiently high value for the line frequency and wherein the current which is applied to load 11 alternately flows through switching transistor 2 or through efficiency diode 7. The output voltage $V_o$, which is the direct voltage produced across the charge capacitor 10, is applied to a comparison circuit 12 which compares voltage $V_o$ with a reference voltage. Comparison circuit 12 generates a direct voltage which is applied to modulator 5 so that the duration of the effective period $\delta T$ of switching transistor 2 relative to the period T of pulses 3 varies as a function of the variations of output voltage $V_o$. In fact, it is readily evident that output voltage $V_o$ is proportional to the ratio $\delta$:

$$V_o = V_i \cdot \delta.$$

Load 11 of the chopper consists in the consumption of parts of the picture display device which are fed by output voltage $V_o$. In a practical embodiment of the circuit arrangement according to FIG. 1 wherein the power main alternating voltage has a nominal effective value of 220 v. and the rectified voltage $V_i$ is approximately 270 v., output voltage $v_o$ for $\delta=0.5$ is approximately 135 v. This makes it possible, for example, to feed a line deflection circuit. Since voltage $V_o$ is maintained constant due to pulse duration modulation, the supply voltage of this line deflection circuit remains constant with the favorable result that the line amplitude (= the width of the picture displayed on the screen of the picture display tube) also remains constant as well as the EHT required for the final anode of the picture display tube and generated in the same circuit independently of the variations in the power main voltage and of the load on the EHT generator (= the variations in brightness).

However, variations in the line amplitude and the EHT may occur as a result of an internal impedance of the EHT-generator which is not small enough. Compensation means are known for this purpose. One possibility within the scope of the present invention is to use comparison circuit 12 for this purpose. In fact, if the beam current flows through an element having a substantially quadratic characteristic, for example, a voltage-dependent resistor, a variation for voltage $V_o$ may be obtained through comparison circuit 12 which variation is proportional to the root of the variation of the EHT which is a known condition for the line amplitude to remain constant.

In addition, smoothing of voltage $V_o$ is facilitated since the repetition frequency of pulsatory voltage 3 is many times higher than that of the power main and it is sufficient to have a comparatively small value for charge capacitor 10. If charge capacitor 10 has a sufficiently high value for the line frequency, The voltage $V_o$ is indeed a direct voltage so that a voltage is produced across the terminals of primary winding 8 which has the same shape as pulsatory voltage 3. Consequently, voltages which have the same shape as pulsatory voltage 3 but have a greater or smaller amplitude are produced across secondary windings 13, 14, 15 of transformer 9 (FIG. 1 shows only 3 secondary windings but there may be more). It is a recognition of the invention to connect one end of each secondary winding to ground while the other end thereof drives a diode, the winding sense of each winding and the direction of conductance of each diode being chosen to be such that these diodes conduct during the same period as does efficiency diode 7. In this manner stabilized supply voltages are generated after smoothing, for example, at terminals 16, 17 and 18 at the amplitudes and polarities required for the circuit arrangements present in the picture display device. In FIG. 1, for example, the voltage generated at terminals 16 and 18, and 17 are positive and negative, respectively, relative to ground. It is to be noted that the load currents of the supply voltages obtained in this manner cause a reduction of the switching power which is economized by efficiency diode 7. The sum of all diode currents including that of diode 7 is in fact equal to the current which would flow through diode 7 if no secondary winding were wound on transformer 9 and no simultaneous diode were used. This reduction may be considered to be an additional advantage of the circuit arrangement according to the invention, for a diode which is suitable for smaller powers may then be used. However, it will be evident that the overall secondary load must not become higher than the primary load since otherwise there is a risk that efficiency diode 7 would be blocked so that stabilization of the secondary supply voltages would be out of the question. It is to be noted that if charge capacitor 10 is given a capacitance which is still smaller, a parabola voltage of line frequency is produced across this capacitor so that the so-called S-correction is established if load 11 is the line deflection circuit.

In FIG. 1 charge capacitors are arranged between terminals 16, 17 and 18 and earth so as to ensure that the voltages on these points are stabilized direct voltages. If in addition the mean value of the voltage on one of these terminals has been made equal to the effective value of the alternating voltage which is required for heating the filament of the picture display tube present in the picture display device, this voltage is suitable for this heating. This is a further advantage of the invention since the cheap generation of a stabilized filament voltage for the picture display tube has always been a difficult problem in transistorized apparatus.

A further advantage of the invention is that transformer 9 may function as a separation transformer, so that the different secondary windings can be separated from the power main and their lower ends can be connected to ground of the picture display device. The latter step makes it possible to connect a further apparatus such as, for example, a magnetic recording and/or playback apparatus to the picture display device without ground connection problems occurring.

As is known the so-called pincushion distortion is produced in the picture display tubes having a substantially flat screen and large deflection angles as are currently used. This distortion is especially a problem in color television wherein a raster correction cannot be performed with the aid of magnetic means. The correction of the so-called East-West pincushion distortion i.e. in the horizontal direction on the screen of the picture display tube can be performed in an elegant manner with the aid of the circuit arrangement according to the invention. In fact, if the voltage generated by comparison circuit 12 and applied to modulator 5 for the purpose of duration modulating pulsatory voltage 3 is modulated by a parabola voltage 19 of field frequency, pulsatory voltage 3 is likewise modulated thereby. If the consumption of the line deflection circuit forms part of the load 11 on the output voltage of the chopper, the signal applied to the line deflection coils is modulated in the same manner. Conditions therefore are that the parabola voltage 19 of field frequency has a polarity such that the envelope of the sawtooth current of line frequency flowing through the line deflection coils has its maximum in the center of the scan of the field period and that charge capacitor 10 has an impedance which is not too low for the field frequency. However, the other supply voltages which are generated by the circuit arrangement according to the invention and which might be hampered by this component of field frequency must be smoothed satisfactorily.

A practical embodiment of the example described with all the reference numerals given yields an efficiency for the supply of approximately 85 percent in case of an overall load of 90 W, the internal resistance for direct current loads being 1.5 ohms and for pulsatory currents being approximately 10 ohms. In case of a variation of ± 10 percent of the power main voltage, output voltage $V_o$ is stable within 0.4 v. Under the nominal circumstances the collector dissipation of switching transistor 2 is approximately 2.5 watts.

Since the internal resistance of the supply is so small it can be used advantageously, for example, at terminal 16 for the supply of a class-B audio amplifier which forms part of the display device. Such an amplifier has the known advantages in that its dissipation is directly proportional to the amplitude of the sound to be reproduced and that its efficiency is higher than that of a class-A amplifier. On the other hand, a class-A amplifier consumes a substantially constant power so that the internal resistance of the voltage supply source is of little importance. If this source is highly resistive the supply voltage is modulated by audio information in the case of a class-B amplifier when the sound intensity is great which may detrimentally influence other parts of the display device. This drawback is obviated by the supply according to the invention.

Circuit arrangement 20 of FIG. 1 is a safety circuit which blocks control stage 4 in case of an overload. As a result the chopper stops. Since charge capacitor 10 has a comparatively small capacitance, load 11 is safeguarded as has already been stated. It is to be noted that the values of the capacitors arranged between terminals 16, 17 and 18 and ground can also chosen to be small if no East-West correction is performed in the manner described. If an overload occurs in one of the circuits fed at these terminals, the current supplied by switching transistor 2 becomes greater so that safety circuit 20 causes the chopper to stop. If the said capacitors have a small capacitance, the said circuit arrangements are safeguarded to the same extent as is the case for load 11. If switching transistor 2 constitutes a short circuit between the emitter and collector with the result that output voltage $V_o$ in Fig. 1 becomes higher, namely equal to $V_t$, the alternating voltages across the secondary windings 13, 14 and 15 and hence also the voltages at terminals 16, 17 and 18 drop out. U.S. Pat. application Ser. No. 27,853, filed on Apr. 13, 1970 shows that a secondary winding of transformer 9 can drive the line output transistor. In the case of the said short circuit this transistor is therefore cut off and is thus safe as well as the picture display tube and other parts of the display deviced fed by terminals 16, 17 and 18 and the like.

Figure 2:
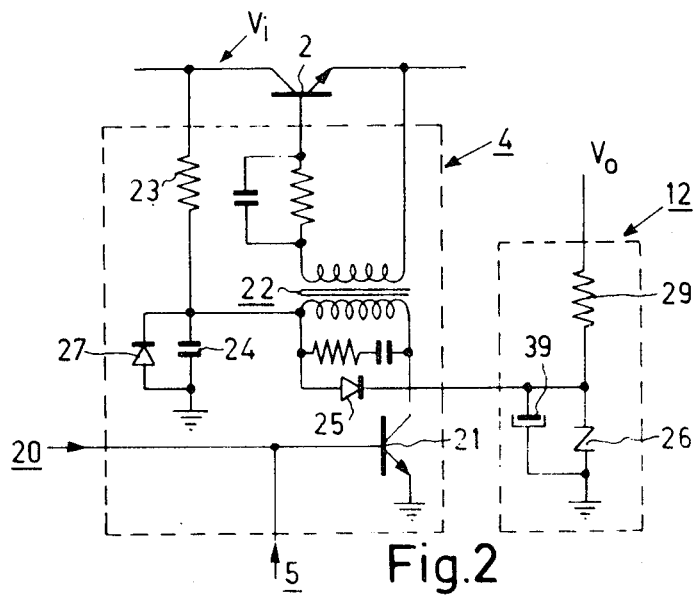
FIGS. 2, 3, 4 and 5 show detailed circuit diagrams of circuit arrangements not shown in FIG. 1.

A few details of the circuit arrangement according to FIG. 1 will be described hereinafter wherein for the sake of simplicity it will be assumed that the second input terminal is connected to ground. FIG. 2 shows an embodiment of control stage 4. The base of driver transistor 21 receives a voltage originating from modulator 5. Driver transistor 21 and switching transistor 2 cannot be DC coupled since the emitter of transistor 2 does not have a fixed potential. This coupling is therefore effected through a transformer 22. Transistors 2 and 21 do not conduct simultaneously. The drive energy of switching transistor 2 is the energy stored in transformer 22 during the period of conductance of driver transistor 21. If the supply voltage of transistor 21 would be constant, the base current of transistor 2 would proportionally vary as a function of the varying period of conductance so that a variation of the switching-on and switching-off periods of transistor 2 would occur. The supply voltage of transistor 21 must therefore become greater when its period of conductance becomes shorter. Transistor 21 is therefore fed through a resistor 23 and a smoothing capacitor 24 by the rectified voltage $V_t$. However, transistor 21 might be damaged if the control signal 5 would drop out. This is prevented by connecting the junction of resistor 23 and capacitor 24 through a diode 25 to the element 26 functioning as a reference voltage in comparison circuit 12 which element may be a zener diode or a voltage-dependent resistor.

When the load current of the chopper exceeds a given value, driver transistor 21 is saturated by means of safety circuit 20 so that switching transistor 2 no longer conducts. Due to the presence of transformer 22 and smoothing capacitor 24, which may have a comparatively small capacitance because the alternating voltage to be smoothed has a fairly high frequency, the voltage across capacitor 24 would then decrease in a freely oscillating manner so that switching transistor 2 would again conduct during the negative portions of this voltage which is exactly to be avoided. This oscillation is, however, short-circuited after half a period by means of a diode 27 which shunts capacitor 24.

Figure 3:
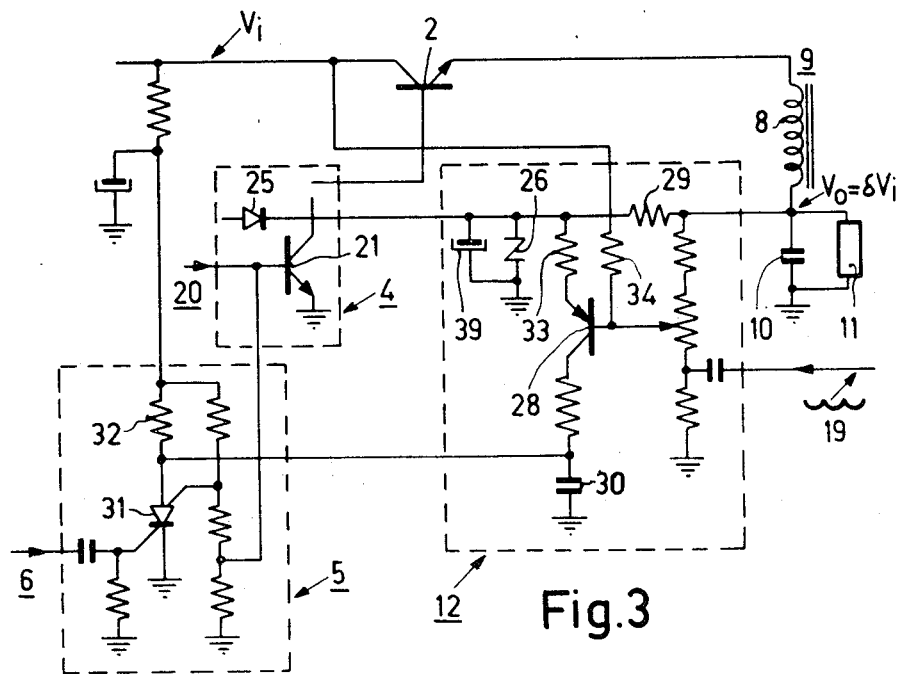

FIG. 3 shows an embodiment of comparison circuit 12 and modulator 5 of FIG. 1. In this case the base of transistor 28 receives information regarding the (adjustable) value of output voltage $V_o$. The emitter voltage of transmitter 28 is maintained substantially constant by means of a voltage-dependent resistor 26 through which a current flows which is adjusted by means of resistor 29 which is connected to output voltage $V_o$. If output voltage $V_o$ varies, the voltage across capacitor 30 which is charged by the collector current of transistor 28 likewise varies. Modulator 5 is provided with a thyristor 31. Due to the choice of the supply resistors in the anode and in the anode gate of thyristor 31 this thyristor conducts, except when a negative pulse originating from oscillator 7 reaches its cathode gate. In the latter case the voltage present at the anode gate increases as well as that at the base of driver transistor 21 connected thereto through a resistor and this transistor becomes conducting. The cutoff period of thyristor 31 is also determined by resistor 32 and capacitor 30. If the voltage across capacitor 30 varies because output voltage $V_o$ varies, this cutoff period likewise varies so that the desired pulse duration modulation is effected. In fact, if output voltage $V_o$ attempts to decrease, the voltage across capacitor 30 increases so that the period of conductance of thyristor 31 becomes longer which results in an increase of output voltage $V_o$. Since the amplification of transistor 28 is fairly large. Oscillations might be produced. This is prevented by resistor 33 which is incorporated in the emitter line of transistor 28.

The 50 Hz. ripple voltage which is superimposed on the rectified input voltage $V_t$ is compensated by comparison circuit 12 and modulator 5 since this ripple voltage can be considered to be a variation of input voltage $V_t$. A further compensation is obtained by applying a portion of this ripple voltage through a resistor 34 of high value to the base of transistor 28. It is then sufficient to have a lower value for the smoothing capacitor which forms part of rectifier circuit 1. The parabola voltage 19 of field frequency originating from the field time base is applied to the same base for the purpose of correcting the East-West pincushion distortion.

Figure 4A:
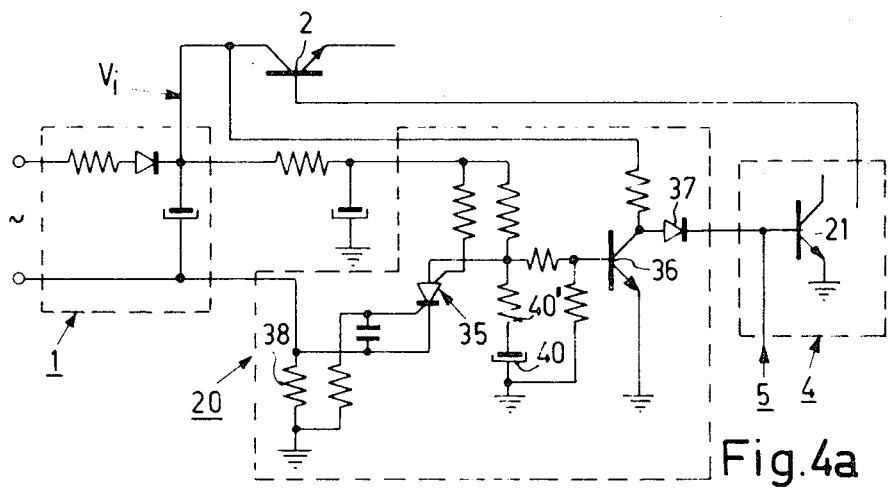

FIG. 4a shows an embodiment of safety circuit 20. During normal operation thyristor 35 remains cut off and transistor 36 conducts so that diode 37 is blocked. Thyristor 35 receives a voltage which is proportional to the collector current of switching transistor 2 by means of a current measuring resistor 38 which is incorporated in the return line of the chopper and in the cathode of thyristor 35. When the voltage across current-measuring resistor 38 exceeds a given value, thyristor 35 starts to conduct and transistor 36 is immediately cut off with the result that a positive voltage is produced at the anode of diode 37. Diode 37 starts to conduct, the base of driver transistor 21 therefore becomes positive and this transistor is heavily saturated so that switching transistor 2 no longer conducts. The chopper then stops completely. Since switching transistor 2 is cut off, the voltage across measuring resistor 38 also drops out and thyristor 35 is cut off again. Subsequently, however, capacitor 40 is charged and after a given period, in the order of 50 ms., transistor 36 starts to conduct again so that the chopper is reactivated. If the overload is still present, driver transistor 21 is again bottomed. Since, as has been described, capacitor 40 is necessary to delay the release of the supply voltage, this capacitor could also have a delaying effect on the switching off of transistor 2 through transistors 36 and 21. To prevent the latter a resistor 40' is arranged in series with capacitor 40 across which resistor a pulsatory voltage is produced when thyristor 35 starts conducting which voltage ensures that transistor 36 is cut off. The speed by which the collector voltage of transistor 36 rises can be controlled thereby.

The period of approximately 50 ms. within which the chopper is put out of operation is long enough to ensure that the different circuit arrangements fed thereby are protected. On the other hand, this period is so short relative to the heating period of the filament of an electron valve that it does not cause any trouble for that of the picture display tube which is fed by the secondary winding of transformer 9. Consequently, as long as the chopper is alternately activated and put out of operation, the temperature of the said filament still remains substantially constant which may be considered to be an advantage of the supply apparatus according to the invention.

Figure 4B:
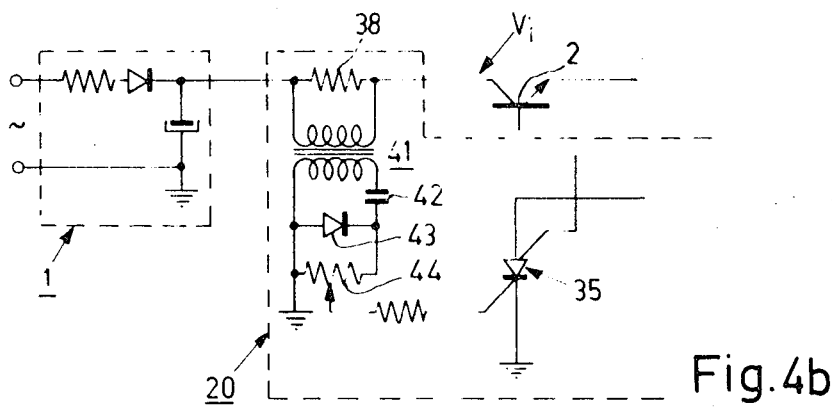

A further embodiment of safety circuit 20 is shown in FIG. 4b. In this FIG. current measuring resistor 38 is incorporated in series with the collector of switching transistor 2 which is advantageous over the description referred to above in that the 50 Hz. ripple voltage across resistor 38 is then lower. This ripple voltage is caused by the fact that other parts of the picture display device are fed by voltage $V_t$. The voltage across current-measuring resistor 38 drives the cathode gate of thyristor 35 through a separation transformer 41 of small value. If the secondary winding of transformer 41 would drive the cathode gate of thyristor 35 through a resistor, the value of the load current activating safety circuit 20 would be dependent in the ratio δ. In fact, the voltage across the said winding is adjusted around its mean value (= ground potential). To prevent this a peak detection is used by means of a capacitor 42 and a diode 43 so that the positive voltage thus created and fed to thyristor 35 only depends on the peak-to-peak amplitude of the current flowing through resistor 38. This voltage is adjustable by means of potentiometer 44 so that it is possible to choose the current above which safety circuit 20 must be activated. Thyristor 35 subsequently drives transistor 36 and diode 37 as is shown in FIG. 4a.

Figure 4C:
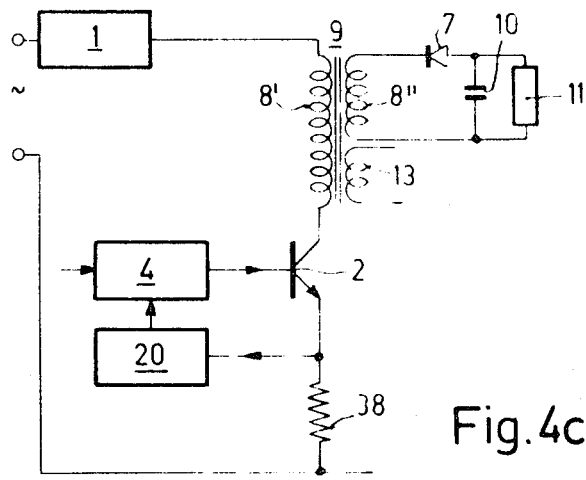

The voltage supply apparatus according to the invention may alternatively be formed as is shown in FIG. 4c. In this FIG. the reference numeral 9 denotes a separation transformer which is exchanged with transistor 2 while efficiency diode 7 is driven by a secondary winding 8" of transformer 9. Current measuring resistor 38 is now incorporated between the emitter of transistor 2 and the return of line of the power main. In this embodiment substantially no ripple current flows through resistor 38.

As has been shown safety circuit 20 operated very quickly. Even in the case of a very short flashover in the picture display tube both the transistor in the line deflection circuit and that in the voltage supply apparatus are safeguarded which may be achieved due to the sensitivity and the short period of response of safety circuit 20 to overloads and due to the lower capacitance of output capacitor 10 which otherwise could provide the flashover current. The picture display device is thus provided with a supply source which is equipped with a very efficient safety circuit so that the reliability is considerably increased.

Figure 5:
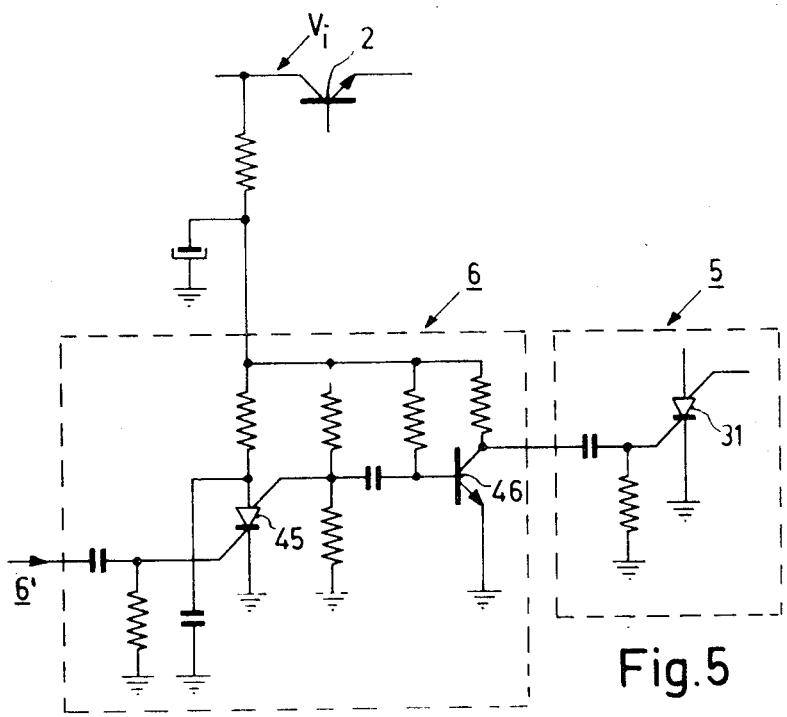

When the chopper is switched on after an overload, comparison circuit 12 must not come into operation too quickly since the charge current of capacitor 10 would then become very high so that the chopper could not be started by safety circuit 20. Since safety circuit 20 reacts very quickly to an overload, it reacts equally quickly after the overload has disappeared with the result that output voltage $V_o$ would be built up too quickly, A similar phenomenon occurs when switching on the apparatus. In addition, in this case all capacitors of the line deflection circuit are discharged so that high-peak currents might be produced and the line output transistor might be damaged. For this reason voltage-dependent resistor 26 is shunted by a capacitor 39 of comparatively high value (see FIG. 3) so that output voltage $V_o$ is only gradually built up due to the time constant of the network 29, 39. Under these circumstances the ratio δ between the effective period of switching transistor 2 and the entire period of pulsatory voltage 3 must be very small, approximately 0.1 Hence this is the reason why a thyristor is used as a modulator instead of, for example, an astable or monostable multivibrator with which small values for δ would be difficult to obtain, An embodiment of pulse oscillator 6 is shown in FIG. 5. In this Figure thyristor 45 which is synchronized by a signal originating from line oscillator saturated 6' oscillates. Transistor 46 is a pulse-shaper which is without a signal and which is cut off by the negative edge of the voltage provided by thyristor 45. Thus a positive pulse which is applied to the cathode gate of thyristor 31 of modulator 5 is produced at the collector of transistor 46. In this manner it is ensured that thyristor 31 conducts, except when a negative pulse is produced at the collector of transistor 46. The minumum cutoff period of thyristor 31 is also determined by the RC-period in the base of transistor 46, which is 6 μus (6 μus corresponds to approximately 0.1 of the line period) during normal operation and is substantially independent of spreads in components and of possible variations in the line frequency. It is achieved thereby that the ratio δ can indeed be brought to very low values (i.e. to δ=0.1) which is necessary if output voltage $V_o$ is to be built up comparatively slowly after an overload or after the apparatus has been switched on. It is to be noted that this and the fact that the output capacitor has a low capacitance can only be achieved if a chopper having a relatively high-switching frequency is used.

It may be advantageous to have two line frequency generators as described above, to wit pulse oscillator 6 and the line oscillator 6' which is present in the picture display device and which is directly synchronized in known manner by line synchronizing pulses 7'. In fact, in this case line oscillator 6' applies a signal of great amplitudes and free from interferences to pulse oscillator 6. However, it is alternatively possible to combine pulse oscillator 6 and line oscillator 6' in one single oscillator 6'' (see FIG. 1) which is an economy of components. It will be evident that line oscillators 6' and 6'' may alternatively be synchronized indirectly, for example, by means of a phase discriminator. It is to be noted that pulse oscillator 6, line oscillator 6' and oscillator 6'' nor modulator 5 can be fed by the voltage supply apparatus described, since output voltage $V_o$ is still not present when the power main voltage is switched on. The said circuits must therefore be fed from the input terminals. If, as described above, these circuits are to be separated from the power main, a separation transformer of small value may be used whose primary winding is connected between the power main voltage terminals and whose secondary winding is connected to ground at one end and controls a rectifier at the other end.

What is claimed is:

1. A circuit for supplying an output voltage to a periodically varying load of a television line deflection oscillator from a power main, said circuit comprising means for rectifying the power main voltage, whereby a voltage having a ripple component is produced; a switch coupled between said rectifying means and the load; means coupled to said switch for generating a periodic pulse switching voltage having a frequency $f$ equal to $nj_1$, wherein $n$ equals an interger, and $f_1$ equals the television line frequency; means for measuring the load current; safety means coupled to said measuring means for blocking said switch when the load current exceeds a selected value; means for varying the output voltage having an input means for receiving a parabola shape periodic voltage of field frequency, whereby horizontal pincushion distortion is corrected; and a capacitor parallel coupled to said load and having a large reactance with respect to said line frequency and a small reactance relative to said field frequency.

2. A circuit as claimed in claim 1 further comprising means for applying the ripple voltage in the rectified voltage to said varying means for compensation thereof.

3. A circuit as claimed in claim 2 wherein said varying means comprises a comparison circuit having a reference voltage source, a first input coupled to receive said parabola voltage, a second input coupled to said load, and a third input coupled to receive said ripple voltage, and an output; and pulse duration modulator means coupled to said comparison circuit output, said generating means, and said switch for maintaining the load voltage substantially constant.

4. A circuit as claimed in claim 1 further comprising a transformer having a primary winding coupled between said switch and said load and at least one secondary winding; an efficiency diode having one end coupled to the junction of said primary and said switch and a second end coupled to said power main; a second diode coupled to one end of said secondary winding, the remaining end of said secondary winding being coupled to ground; whereby said second diode conducts at the same time as said efficiency diode.

5. A circuit as claimed in claim 4 further comprising a capacitor having a small capacitance coupled between said second diode and ground.

6. A circuit as claimed in claim 4 further comprising a display tube having a filament coupled to said secondary winding.

7. A circuit as claimed in claim 3 wherein said modulator comprises a thyristor, whereby after an overload or circuit turn on the switch turnoff time is small.

8. A circuit as claimed in claim 7 wherein said reference voltage means comprises a voltage dependent element and further comprising a large value capacitor shunt coupled to said voltage dependent element and a resistor coupled between said load and said element; whereby after an overload or a circuit turn on the switch turnoff time is small.

9. A circuit as claimed in claim 3 wherein said generating means comprises an oscillator coupled to said modulator and directly to said rectifying means; and further comprising a control stage coupled between said modulator and said switch and also being coupled to said rectifying means; and a resistor coupled between said rectifying means and said control stage.

10. A circuit as claimed in claim 9 further comprising a transformer having a primary winding coupled to said switch, and a secondary winding having one end coupled to said resistor; a transistor coupled to the remaining end of said secondary; a diode having a cathode coupled to the junction os said secondary and said resistor and a cathode coupled to said power main; and a resistor shunt coupled to said diode.

* * * * *

UNITED STATES PATENT AND TRADEMARK OFFICE
CERTIFICATE OF CORRECTION

PATENT NO. : 3,629,686
DATED : December 21, 1971
INVENTOR(S) : WILHELMUS T. H. HETTERSCHEID ET AL It is certified that error appears in the above–identified patent and that said Letters Patent are hereby corrected as shown below:

IN THE SPECIFICATION

Column 6, line 59, "bottomed" should be --saturated--;
C
Column 7, line 72, cancel "saturated";

line 73, after "is", second occurrence, insert

-- saturated --.

Claim 1, line 48, "$nj_1$" should be --$nf_1$--.

Signed and Sealed this

Twenty-second Day of March 1977

[SEAL]

Attest:

RUTH C. MASON
Attesting Officer

C. MARSHALL DANN
Commissioner of Patents and Trademarks